Dec. 19, 1961 C. B. BANOVAC 3,013,728
AGRICULTURAL SPRAYING APPARATUS
Filed Jan. 19, 1959 4 Sheets-Sheet 3
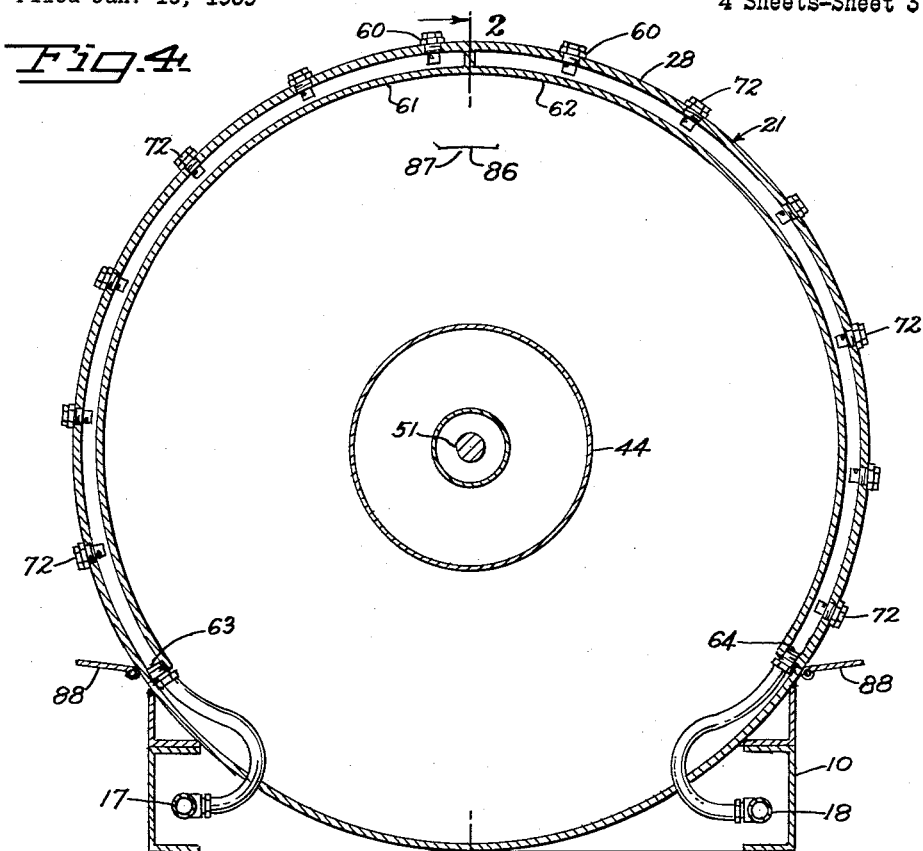
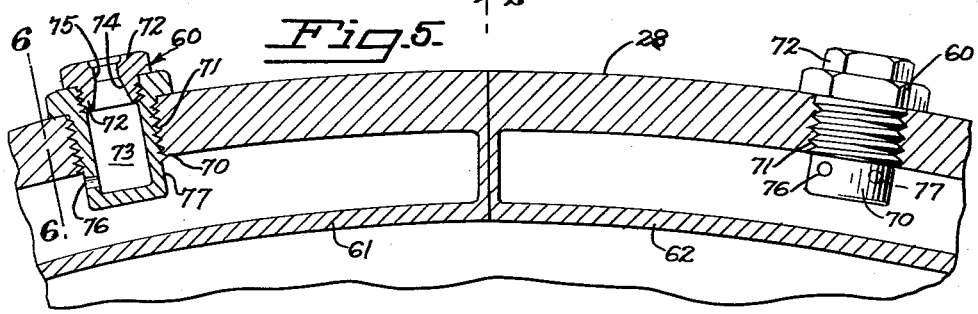
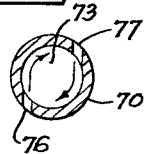
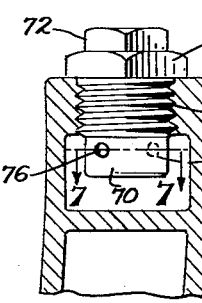
INVENTOR.
CHARLES B. BANOVAC
BY
ATTORNEY.

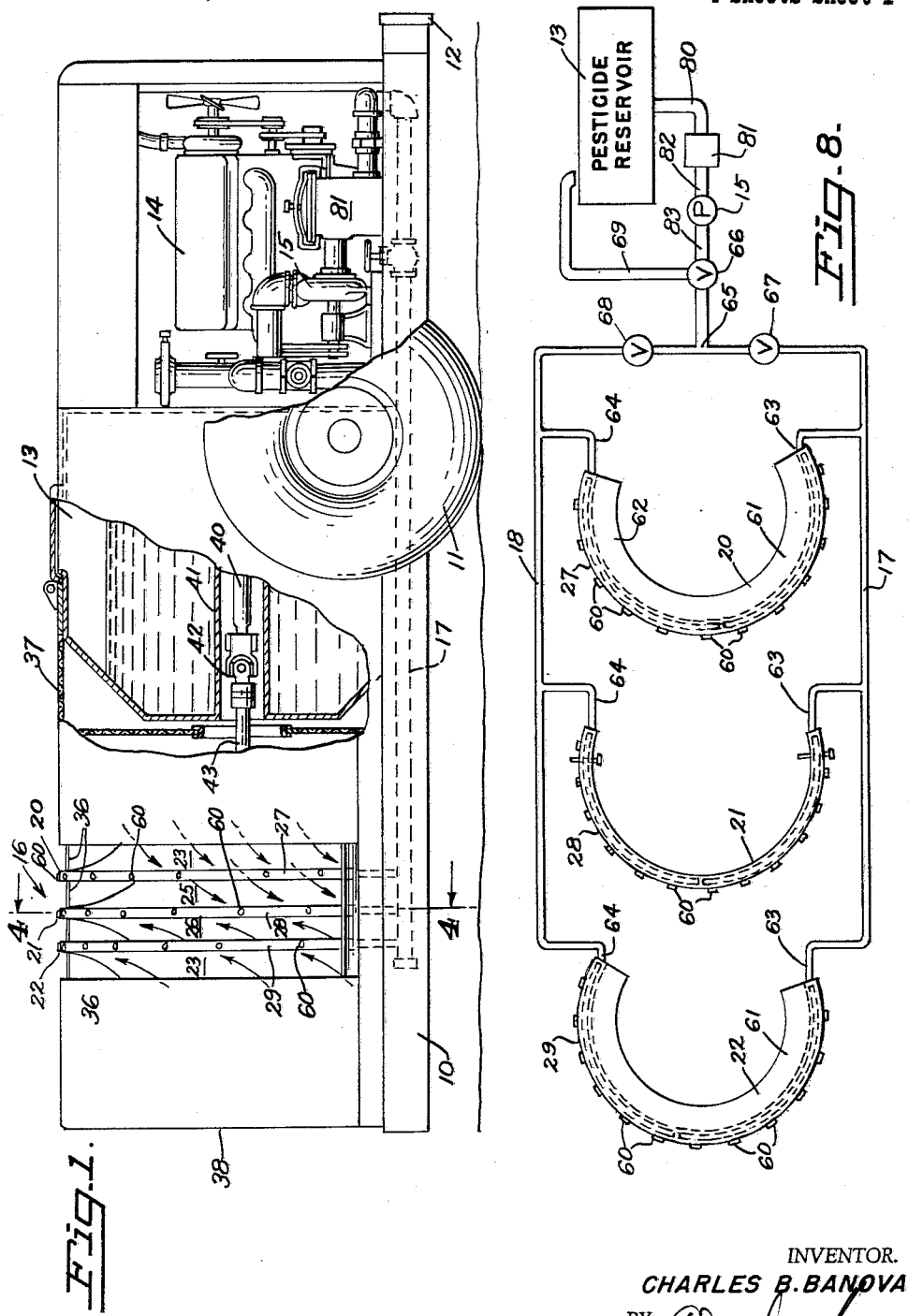

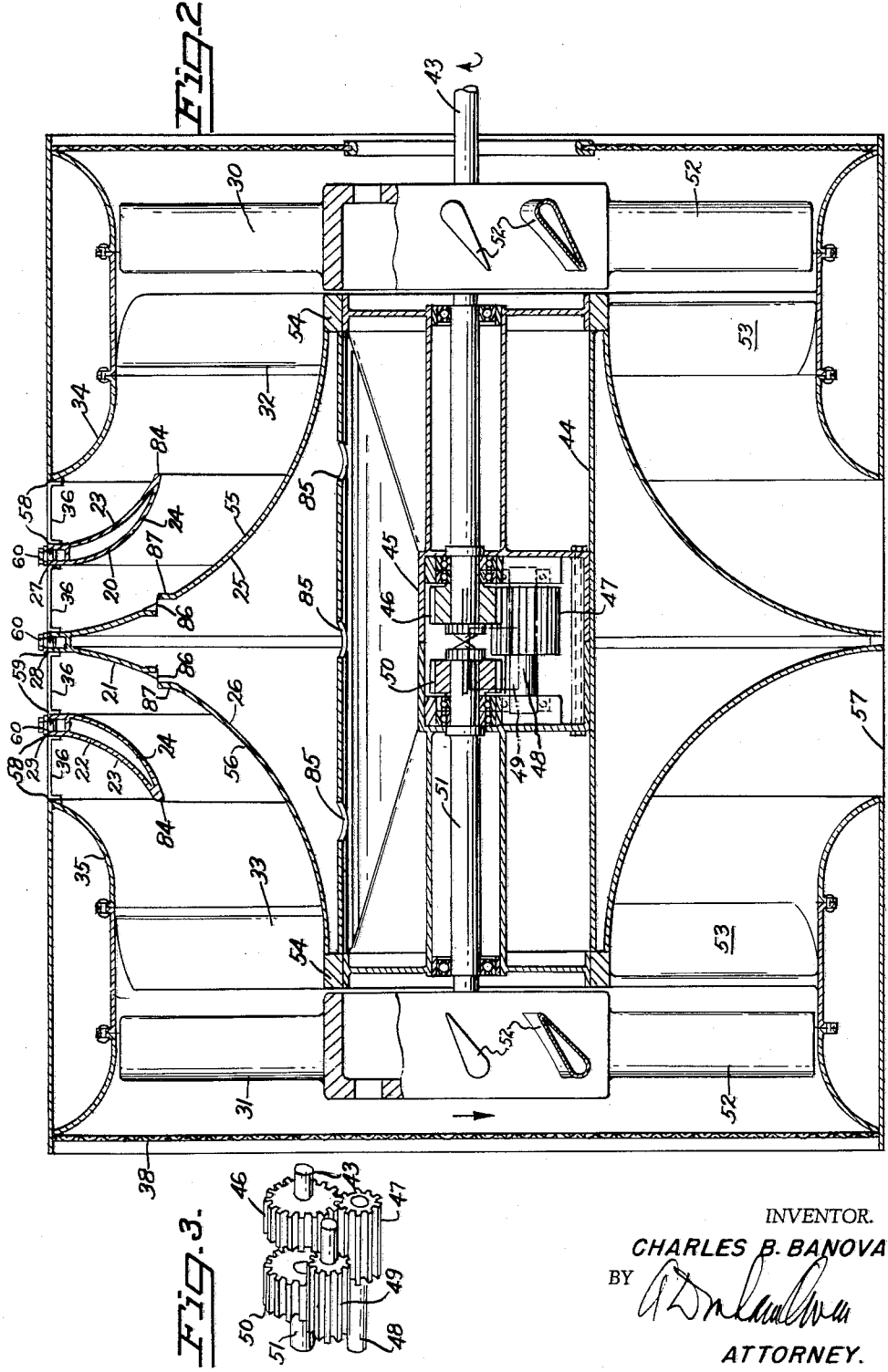

Dec. 19, 1961 C. B. BANOVAC 3,013,728
AGRICULTURAL SPRAYING APPARATUS
Filed Jan. 19, 1959 4 Sheets-Sheet 4
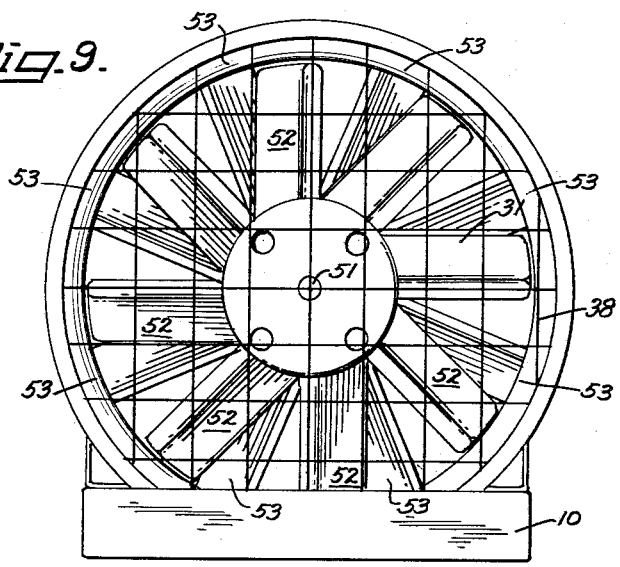
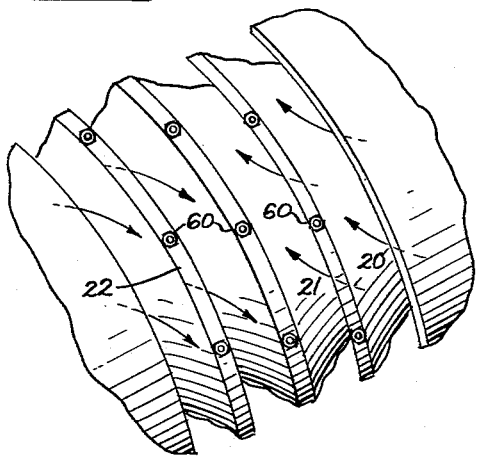
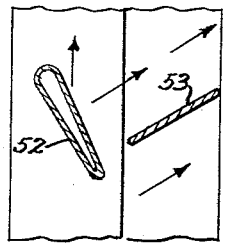
INVENTOR.
CHARLES B. BANOVAC
BY
ATTORNEY.

United States Patent Office 3,013,728
Patented Dec. 19, 1961

3,013,728
AGRICULTURAL SPRAYING APPARATUS
Charles B. Banovac, 711 California St.,
Watsonville, Calif.
Filed Jan. 19, 1959, Ser. No. 787,439
10 Claims. (Cl. 239—77)

This invention relates to improvements in agricultural spraying apparatus of the type wherein a pesticidal spray is fed into an air blast discharged by the apparatus, thereby creating a fine fog of spray for contact with plants, particularly trees, bushes, and the like. More particularly, the invention relates to a wheel-mounted orchard sprayer of the air-blast type, designed to be pulled over the ground by a prime mover in between the trees. This application is a continuation-in-part of application Serial No. 703,571, filed December 18, 1957, now abandoned.

The general problem confronting such sprayers is how to obtain complete and uniform coverage—how to carry the pesticide to the very tops of the trees and cover the branches or leaves with the proper amount, wasting as little of the pesticide as is consonant with proper coverage. Heretofore, none of the mobile, tractor-drawn orchard sprayers has been satisfactory. They have failed to reach the tops of the trees, have failed to cover the leaves, have failed to give uniform coverage, and have failed to produce a strong, even, high velocity fog. The present invention solves this general problem.

One factor that has made solution of the general problem more difficult has been the effect of wind. Air-blast sprayers pick up their air from the atmosphere while the sprayer is moving. When moving with the wind, most sprayers have their air-blast augmented by the wind, so that the spray carries further than it normally would. But when moving against the wind, the spray falls far short of the treetops. This effect on the air blast is in addition to the direct effect of the wind on the spray and is a more serious effect.

An important object of the present invention is to solve this problem and to obtain a more uniform air-blast, whose initial force is not greatly influenced by the direction of the wind. This the present invention accomplishes by employing two fans or blowers arranged back-to-back, driven by the same power but in opposite directions (through a gearing arrangement that is novel in sprayers). Thus air is always being pulled from the direction in which the sprayer is moving and from the opposite direction at the same time. A novel deflection arrangement sends both air blasts out in a plane perpendicular to the sprayer and at the same location. As the air blast leaves the sprayer, it picks up liquid from nozzles disposed around the periphery of the deflectors and forms a single spray whose net coverage is therefore relatively unaffected by light winds.

The two, axially arranged, oppositely rotating fans induce opposing, radially directed airstreams. Each airstream is swirling, but in opposite directions; so the effect is a uniform spray on both sides of the sprayer. No anti-swirl vanes are used to stop this swirling; the supporting members are, in fact, tilted parallel to the direction of the swirl of the airstream; it is a very desirable and novel feature of the invention. It gives uniform spraying from the ground up, over the top and down to the ground on the other side of the sprayer. Moreover, there is no retarding or slowing of the airstreams.

It follows that when the two opposing airstreams are forced together by atmospheric pressure and by the partial vacuum around the outer edge of the deflector on which the spray nozzles are mounted, a swirling and breaking-up action is imparted to the liquid spray droplets, resulting in a much finer spray that was heretofore not possible and that can be carried further by the airstream that can sprays heretofore known.

Another object of the invention is to provide for spraying from both fans on either but only one side at a time of the machine or on both sides at once, so that spray is not wasted at the ends of the orchard and so that, in between the ends, both sides of each row can be sprayed simultaneously.

Another object is the provision of a novel and superior type of manifold mounting for an agricultural sprayer.

Another object is to give more effective dispersion of the liquid spray in the air blast by a novel positioning and form of manifold and of spray nozzles therein in relation to the air-directing baffles.

Another object is to provide a non-plugging nozzle of superior design that assures the issuance of a fine spray into the air blast.

Other objects and advantages of the invention will appear from the following description of a preferred embodiment thereof.

In the drawings:

FIG. 1 is a view in side elevation, with some parts broken away and shown in section, of an agricultural sprayer embodying the principles of this invention.

FIG. 2 is an enlarged view in longitudinal vertical section of the rear portion of the sprayer of FIG. 1, taken along the line 2—2 in FIG. 4.

FIG. 3 is a perspective view of the gear arrangement used to obtain the two converging oppositely whirling airstreams.

FIG. 4 is an enlarged view in cross section taken along the line 4—4 in FIG. 1, but on a smaller scale than FIG. 2.

FIG. 5 is a further enlarged fragmentary view in section of the uppermost pair of spray nozzles and the adjacent portions of their respective manifolds.

FIG. 6 is a view in section taken along the line 6—6 in FIG. 5 and showing one of the nozzles and its mounting in its manifold.

FIG. 7 is a view in section of the nozzle taken along the line 7—7 in FIG. 6.

FIG. 8 is a flow diagram of the piping in the unit.

FIG. 9 is a view in end elevation of the spray housing and frame.

FIG. 10 is a fragmentary perspective, partly diagrammatic, showing the issuance of two oppositely swirling airstreams.

FIG. 11 is a fragmentary view in side elevation and in section showing the relation between the fan blades and the supporting members adjacent them.

The agricultural sprayer shown in FIG. 1 has a main frame 10 mounted on wheels 11 and having a coupler 12 at its forward end, where it may be connected to a tractor or other prime mover. The central portion of the sprayer comprises a large storage tank 13, where the pesticidal liquid is carried. The forward end of the frame 10 preferably carries the power plant, including an engine 14, which drives the fans and also a pump 15 for moving the liquid from the tank 13 to the spraying apparatus 16 at the rear end of the frame 10, via a pair of pipes 17 and 18 (see FIGS. 4 and 7), one along each side of the frame 10, and for forcing the liquid out from the spraying apparatus 16.

The spraying unit 16 contains three manifold and airstream-directing housings 20, 21, and 22. The housings 20 and 22 are symmetrical, comprising two identical metal airstream-directing members 23 and 24 (see FIG. 2) formed as shown in the drawings and as will be described in more detail below. The housing 21 comprises two identical metal airstream-directing members 25 and 26. Each end manifold housing 20, 22 has an associated fan 30, 31 and a stationary support assembly 32, 33 and is located between the housing 21 and baffles 34, 35. This structure sends the airstreams out around the outer peripheries 27, 28, and 29 of the manifold housings 20, 21, and 22 as a strong blast of air moving radially outwardly. The frame 10 supports the baffles 34, 35 and the housing 21, and these support the manifold housings 20 and 21 in proper alignment by means of bars 36. Air intake for the fans is provided by perforate covers 37 and 38 adjacent the respective intake sides of the two fans 30 and 31. The forward cover 37 is preferably mounted on hinges (not shown) for better access to the interior. The air from the forward fan 30 moves initially toward the rear of the frame 10 and is turned radially outwardly by the housings 20 and 21 and the baffle 34. The air from the rear fan 31 moves initially toward the forward end of the frame 10 and is turned radially outwardly by the housings 21 and 22 and the baffle 35.

The two fans 30 and 31 (see FIG. 2) are substantially identical and are both turned—but in opposite directions—by the same engine 14. The engine 14 rotates a shaft 40 that extends rearwardly through a tubular housing 41 (FIG. 1), which extends through the tank 13 and shields the shaft 40 from the liquid in the tank. The shaft 40 is connected by a universal joint 42 to a second shaft 43, on which is mounted the fan 30 for direct rotation in the same direction as the shafts 40 and 43. Beyond the fan 30, the shaft 43 is shielded by a tubular housing 44 and extends therethrough rearwardly of the fan 30 into a gear housing 45, where it terminates in a drive gear 46 (FIG. 2).

The drive gear 46 turns a driven gear 47 mounted on a shaft 48. The gear 47 turns a third gear 49 in the same direction as that in which the gear 46 turns, and the gear 49 drives a gear 50 in the opposite direction from the gear 46 (see FIG. 3). The gear 50 is on one end of a shaft 51, and the shaft 51 is secured to and drives the rear fan 31, rotating it in the opposite direction from, but at the same rate of speed as, the fan 30.

As a result of this construction of oppositely rotating fans 30 and 31—both inevitably turning at the same speed—the eventual single blast of air, obtained when the airstreams from the fans 30 and 31 merge into one radial airstream, is equalized with respect to any wind that would affect the airstream produced by either fan.

On both fans 30, 31 the blades 52 extend in the same tilted direction, as shown in FIG. 2, and propel the air toward the other fan. These generally axial airstreams are passed through respective support assemblies 34, 35 with members 53 mounted oppositely to the blades 52 (see FIGS. 2 and 8) of the fans so as not to interfere with the whirling of the air toward the control housing 21, preferably at an angle of about 25° to the axis. The support members 53 of the assembly 32 are staggered with respect to those on the assembly 33, being spaced approximately half way between them. The housing 21 is riveted, welded, or otherwise secured to a frame-supported tubular member 54 (the support for the member 54 may be provided by the member 53, which is secured to it, some of the members 53 being secured to the frame 10). Both sides of the housing 21 are curved to provide surfaces 55, 56 suitable for smooth flow of air from the fans 30, 31 over a change in direction from axial to radial, and the surfaces 55, 56 terminate together at the periphery 28, where the two airstreams merge into one radial stream (see FIG. 10). The baffles 34 and 35 similarly limit and guide the radially outer portion of the axial airstream from the fans 30 and 31.

The manifolds 20 and 22 are, respectively, spaced from the central manifold 21 and from the baffles 34 and 35, so as to lie in about the middle of their respective airstreams, and they are curved like the housing 21, each of their outer peripheries 27 and 29 terminating in the middle of radially extending peripheral openings 58 and 59. Therefore, air comes around both sides of the manifolds 20 and 21 around their full effective peripheries 27 and 29 (note that the bottom is closed by a plate 57, since no spray is sent out over the bottom 135° or so). This air picks up liquid issuing from nozzles 60 and carries it radially outwardly, enveloped in the radial air blast.

Each manifold housing 20, 21, and 22 comprises two manifolds 61 and 62 in the single two-piece housing. The pieces 23 and 24 are identical and are purposely made off-center, as shown in FIG. 5, so that when mounted on the frame 10, the nozzles 60 will be staggered—those in the manifold 21 being located midway between those of the manifold 20 and those in the manifold 22 (see FIG. 10). Both manifolds 61 of the housings 20, 21, and 22 are on the left side of the frame 10 and both manifolds 62 are on the right side of the frame 10. The manifolds 61, 62 have respective inlets 63, 64 connected to the respective pipes 17 and 18. The pipes 17 and 18 lead from two arms of a common T 65. A main valve 66 at the T 65 makes it possible to shut off both pipes 17 and 18, the pump 15 then returning its flow through a pipe 69 to the tank 13 (FIG. 7). The pipe 17 also has its own valve 67 and the pipe 18 has its own valve 68, so that liquid can be directed to the manifolds 61 alone on the left side of the manifolds 20, 21, and 22 by closing the valve 68 and opening the valve 67. Similarly, only the manifolds 62 may be used by closing the valve 67 and opening the valve 68.

The spray nozzle 60 (FIG. 5) comprises a main housing 70 exteriorly threaded to fit in threaded openings 71 in the manifolds 61 and 62. The nozzle housing 70 is also interiorly threaded to receive an exteriorly threaded nozzle fitting 72 at the upper end of a chamber 73. The interior of the fitting 72 provides tapered or conical walls 74 leading to a wide single exhaust opening 75. The lower end of the side walls of the housing 70 is bored to provide two tangentially extending passages 76 and 77 leading from the manifold 61 or 62 into the chamber 73. Thus, the liquid in the manifolds 61 and 62 is placed by the pump 15 under pressure sufficient to expel it with great force through the passages 76 and 77 into the chamber 73, where it is whirled around while being expelled through conical passage 74 and the opening 75. Already broken up and issuing with great force, the liquid is picked up in the middle of the airstream from the fans 30 and 31 and carried out to the vegetation as forceful but fine fog-like spray.

In operation, then, the pump 15 draws liquid from the tank 13 through a pipe 80, strainer 81, and pipe 82 and sends it through a pipe 83 to the T 65. If the valve 66 is in "off" position, the liquid is returned to the tank 13 through the pipe 69. If the valve 66 is in "on" position, it passes into valves 67 and 68 which control its entry to the respective pipes 17 and 18. The pipe 17 leads it to the left-side manifolds 61 of manifold housings 20, 21, and 22 while the pipe 18 leads to the right-hand manifolds 62 of manifold housings 20, 21, and 22. By proper control of the valves 67 and 68, the liquid may be sprayed from both sides at once or either side alone.

Meanwhile the engine 14 drives the fan 30 in one direction through the shafts 40 and 43 and drives the other fan 31 in the opposite direction through the gears 46, 47, 49, and 50 and the shaft 51. The oppositely rotating fans 30 and 31 drive air toward each other, whirling it in opposite directions, thereby balancing wind effects. The whirling of the air is not affected by the respective assemblies 32 and 33, nor is its velocity slowed, and each airstream is parted by the tapered, narrow end 84 of the manifold housings 20 and 22, and the housing 21 and the baffles 34 and 35 cooperate to turn the airstreams smoothly into two oppositely whirling radial airstreams.

As the air is forced out radially, it picks up liquid that is being forced out through the nozzles 60 in well-broken-up form. The staggering of the nozzles 60 between the three manifold housings 20, 21, and 22 assures even distribution in the airstream.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

The device has the added advantage that the fans may be used to keep the gears cool by sending air streams through suitable perforations, not shown, in the gear housing 44 whence the air passes out through the openings 85 and openings 86 in the members 55 and 56. The openings 86 are formed by making slits in the members 55 and 56 and then bending out portions 87.

For many uses it will also be advisable to provide deflectors 88 which may be hinged along the lower ends of the nozzle assembly in order to prevent the spray from being forced directly to the ground. By being hinged the deflectors can be bent down where it is desired to spray the ground. As stated before, still other changes and additions may be made in the structure.

I claim:

1. An agricultural sprayer having a frame supporting a pair of oppositely rotating coaxially mounted fans sending axial airstreams toward each other, whirling in opposite directions, curved surfaces separating the fans and directing the axial airstreams into touching radial airstreams whirling in opposite directions, and manifolds positioned in the airstreams so that air passes on both sides thereof, said manifolds having nozzles on an outer peripheral portion in the midst of the radial airstreams, said oppositely whirling airstreams serving to provide a uniform spray on both sides of the sprayer even in the presence of light winds and also to impart a swirling and breaking-up action to liquid spray droplets issuing from said nozzles.

2. The sprayer of claim 1 wherein there are three said manifolds, a central one having said curved surfaces thereon and lying between the two airstreams, each of the other two having curved airstream-deflector means and being spaced on opposite sides of the central one in the center of its respective airstream.

3. The sprayer of claim 1 wherein each manifold is dual, each providing one manifold unit for each side of the frame, and two separate control valve means, one for the manifold units on one side and the other for the manifold units on the other side, so that liquid can be sprayed through either side alone or through both sides at once.

4. The sprayer of claim 1 wherein there are three said manifolds and the nozzles at one manifold are staggered relative to those at the other two manifolds.

5. An agricultural sprayer having a frame, wheels supporting said frame, an engine supported on said frame, a first shaft driven rotatably by said engine, a first fan with blades set at an angle to said first shaft and rotated by said first shaft, a first gear on the end of said first shaft, a second gear parallel to and driven by said first gear, a third gear parallel to and driven by said second gear, a fourth gear parallel to and driven by said third gear in the opposite direction from said first gear and substantially coaxial with said first gear, a second shaft substantially coaxial with said first shaft and supporting said fourth gear and rotated thereby in the opposite direction from said first shaft, a second fan mounted on said second shaft with blades positioned thereon in the same attitude as the blades on said first fan, said fans thereby being coaxial and oppositely rotating and directing oppositely whirling axial airstreams toward each other, curved surfaces supported on said frame directing said axial airstreams into a pair of oppositely whirling and immediately adjacent radial airstreams, and nozzles supported by said frame in the midst of the radial airstreams.

6. An agricultural sprayer having a wheel-supported frame; power means supported on said frame; a first shaft driven rotatably by said power means; a first fan with blades mounted at an angle on and rotated by said first shaft; a second shaft; reversing means for driving said second shaft by said first shaft in the opposite direction from said first shaft; a second fan mounted on said second shaft with blades mounted thereon in the same attitude as the blades on said first fan, said fans being coaxial and oppositely rotating and directing oppositely whirling axial airstreams toward each other; air intake means for each fan on the sides thereof away from each other; curved air deflecting means supported in said frame and extending axially adjacent each fan and curving to a radial rim where said baffles meet, directing said axial airstreams into radial airstreams that meet at a common radial interface; nozzles supported by said frame in said radial airstreams; and means for pumping liquid to said nozzles.

7. The sprayer of claim 6 wherein one set of nozzles is arranged in a circle at said common radial interface, and two other sets of nozzles are arranged each in the middle of one said radial airstream.

8. An agricultural sprayer having a wheel-supported frame, a pair of oppositely rotating, coaxially mounted fans supported by the frame and sending axial airstreams toward each other, a pair of curved members separating the fans and meeting each other at a radial outer periphery, their portions adjacent the fans being axial, directing the axial airstreams into radial airstreams, nozzles positioned in the airstreams adjacent said radial periphery so that air passes on both sides thereof, and means for pumping liquid to said nozzles.

9. An agricultural sprayer having a frame supporting a pair of oppositely rotating fans sending axial airstreams toward each other, a casing surrounding said fans axially, curved air deflecting means separating the fans and directing the axial airstreams into touching radial airstreams, nozzles positioned in the radial airstreams so that air passes on both sides thereof, and means for supplying flowable non-gaseous agricultural spray material to said nozzles.

10. An agricultural sprayer having a frame supporting a pair of oppositely rotating coaxially mounted fans sending axial airstreams toward each other, whirling in opposite directions, curved surfaces separating the fans and directing the axial airstreams into touching radial airstreams whirling in opposite directions, and manifolds positioned in the airstreams so that air passes on both sides thereof, said manifolds having nozzles on an outer peripheral portion in the midst of radial airstreams, each manifold being made from two identical pieces and identical pieces being used in both end manifolds.

References Cited in the file of this patent

UNITED STATES PATENTS

| | | |
|---|---|---|
| 2,218,110 | Hosmer | Oct. 15, 1940 |
| 2,569,274 | Andrews | Sept. 25, 1951 |
| 2,608,441 | Daugherty | Aug. 26, 1952 |
| 2,618,508 | Daugherty | Nov. 18, 1952 |

FOREIGN PATENTS

| | | |
|---|---|---|
| 156,451 | Australia | May 14, 1954 |
| 672,041 | Great Britain | May 14, 1952 |